F. GARACA.
BATTERY.
APPLICATION FILED OCT. 15, 1918.

1,415,832.

Patented May 9, 1922.

Witnesses
James F. Crown
S. M. McColl

Inventor
Frank Garaca,
By Richard B. Owen,
Attorney

UNITED STATES PATENT OFFICE.

FRANK GARACA, OF CLEVELAND, OHIO.

BATTERY.

1,415,832.     Specification of Letters Patent.     Patented May 9, 1922.

Application filed October 15, 1918. Serial No. 258,164.

*To all whom it may concern:*

Be it known that I, FRANK GARACA, a citizen of the United States, residing at Cleveland, in the county of Cuyahoga and State of Ohio, have invented certain new and useful Improvements in Batteries, of which the following is a specification.

This invention relates to batteries for generating electricity and the object thereof is to provide a battery of this character which requires no chemicals.

Another object is to provide a battery of this character which when extraneously heated generates electricity.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
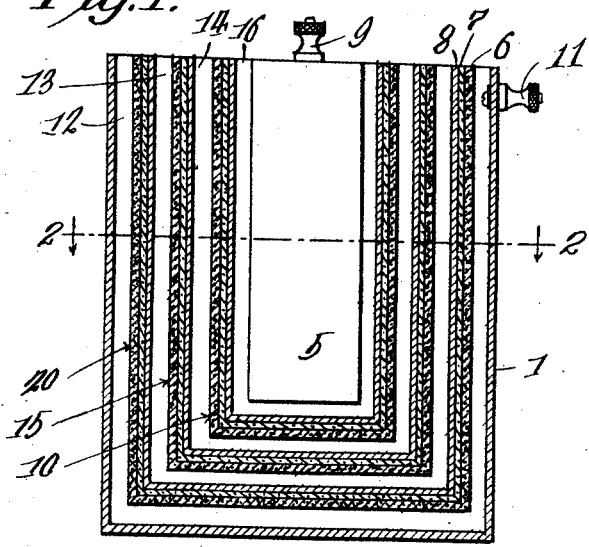
Figure 2:
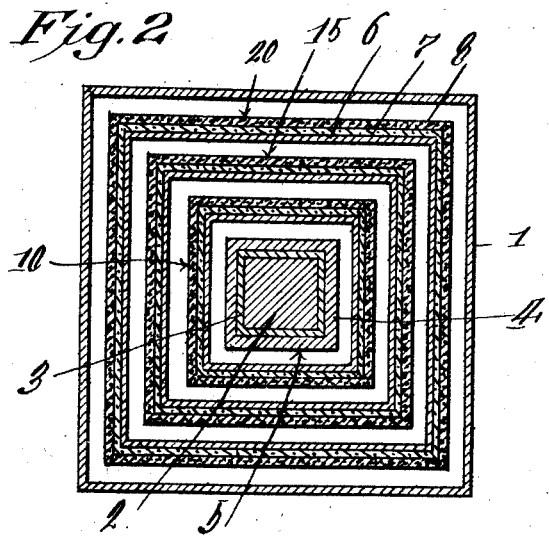

Figure 1 represents a vertical section through a battery constructed in accordance with this invention, and Fig. 2 is a transverse section taken on the line 2—2 of Fig. 1.

In the embodiment illustrated is shown what may be termed a four-in-one battery, although obviously it may be made in the form of a single cell or any desired number of cells may be used, the invention not being restricted to the use of four. The battery constituting this invention comprises an outer casing 1 constructed of iron or other suitable material in which is arranged a plurality of cells formed by cup-like elements 10, 15 and 20 spaced laterally apart to form spaces between them for the water to be used in connection therewith, a central element 5 being arranged within cell 10. This central element is composed of a solid core 2 of iron encased in a glass casing 3 and surrounded by a metal casing 4.

Each wall of the cells above referred to is composed of an outer casing 6 of carbon arranged around a correspondingly shaped glass partition 7 within which latter is disposed an iron partition 8, the three being arranged in close proximity as is shown clearly in the drawings. These cup-like partitions or cells are spaced from the bottom of the casing 1 and the bottoms thereof are spaced from each other as is shown clearly in Figure 1. This battery or cell is open at its top in the usual manner and the central member has a binding post 9 for the connection of the positive conducting wire, the negative wire being connected at 11. The cell chambers 12, 13, 14 and 16 are filled with water or nearly so and heat is applied extraneously to the battery and when the battery becomes thoroughly heated, the water in the cells will boil and electricity be generated. As long as the battery is heated the electricity will be generated but as soon as it becomes cold, generation ceases.

A battery constructed as above described is especially adapted for use in connection with the gas engines or other electric plants, the steam pipes of which may pass so as to contact with the batteries and impart thereto sufficient heat to generate electricity within the pipes.

On the bottom of each iron casting an insulating member must be arranged to prevent short circuit in the cells. When high voltage and high current is desired aluminum is substituted for iron so that a cell producing one volt and sixteen amperes when using iron will produce one and a half volts and thirty-two amperes in a single cell employing aluminum.

It is understood that with electric batteries containing acid, the acid acting upon the zinc produces heat which generates electricity. The heating of the water in this battery causes it to boil and produces the same effect that the boiling produced by chemicals in other batteries accomplishes. It will thus be found however, that as soon as the water becomes cool no electricity will be generated.

The theory of operation of the battery constituting this invention is that when the cell is heated the resistance is lowered and at the same time the water will attack the metal which forms the negative pole and since the carbon cannot be attacked by the water it will become positive. A large quantity of metal being contained in each cell lowers its resistance and generates a large output of current.

From the above description it will be obvious that a battery constructed in accordance with this invention is extremely cheap to manufacture and to operate, the application of heat thereto operating to generate electricity which may be used for many purposes in the same manner that a direct current or a battery current can be used. After the battery has been charged it will remain so for several days if the electricity is not discharged therefrom and it will furnish a steady current as long as it is heated. This battery may be used for an indefinite length of time as the iron used in the cells thereof is consumed very slowly.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A battery of the class described comprising a metal casing containing water, and means therein whereby electricity is generated in said battery on the application of heat to the casing.

2. A battery of the class described comprising a metal casing having a plurality of elements disposed therein and spaced from each other to form cells between them, water disposed in said cells, the walls of each element being composed of a layer each of carbon, insulation and iron, the insulation separating the carbon from the iron.

3. A battery of the class described comprising a metal casing having a cell disposed therein and spaced from the walls thereof, the walls of said cell being composed of a layer of insulation interposed and in contact with layers of carbon and metal, a carbon core arranged in said cell and spaced therefrom, binding posts connected respectively with said core and casing, and water disposed in and around the cell.

4. A method of producing electricity which consists in heating a cell composed of iron containing water and having a carbon electrode immersed in the water.

5. In an electric battery a metal member constituting the negative pole and a carbon member, the positive pole with water contacting with both of them and forming the electrolyte.

6. An electric battery comprising a metallic container, a plurality of similarly shaped elements disposed one within the other and within said container and being spaced from each other and the container, electrolyte between the elements and container and each element having an inner layer of metal, an outer layer of carbon with insulation between the layers.

In testimony whereof I affix my signature in presence of two witnesses.

FRANK GARACA

Witnesses:
J. C. OSSMANN.
L. McFARLIN.